No. 821,154. PATENTED MAY 22, 1906.
E. P. BREWER.
AUTOMOBILE.
APPLICATION FILED FEB. 4, 1905.
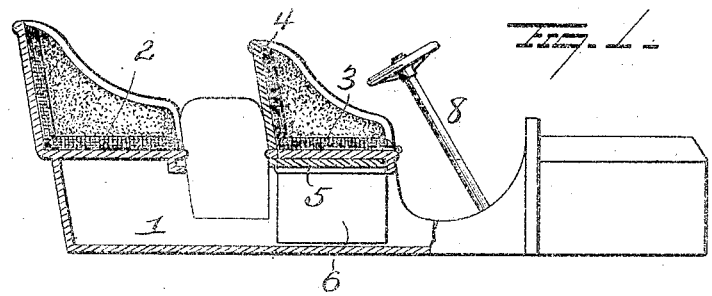
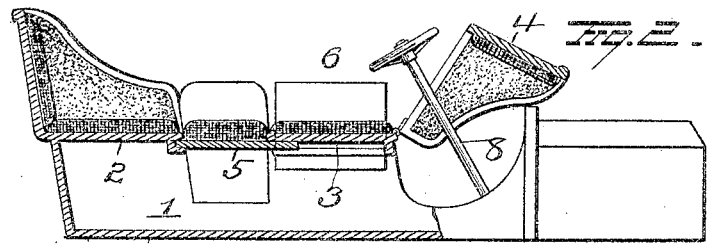
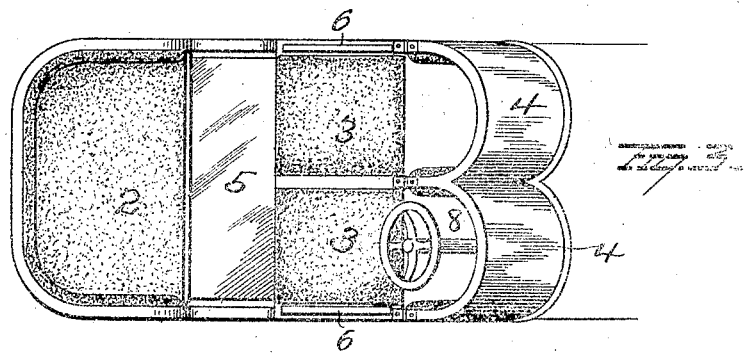
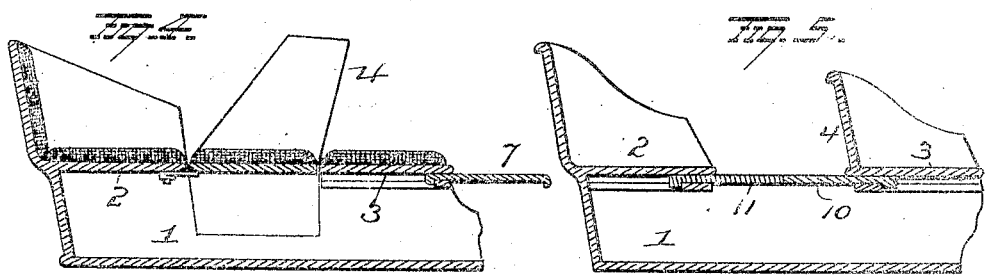
WITNESSES
INVENTOR
E. P. Brewer
Attorney

UNITED STATES PATENT OFFICE.

EDGAR P. BREWER, OF SPOKANE, WASHINGTON.

AUTOMOBILE.

No. 821,154.

Specification of Letters Patent.

Patented May 22, 1906.

Application filed February 4, 1905. Serial No. 244,114.

*To all whom it may concern:*

Be it known that I, EDGAR P. BREWER, a resident of Spokane, in the county of Spokane and State of Washington, have invented certain new and useful Improvements in Automobiles; and I do hereby declare the following to be a full, clear, and exact description of the invention, such as will enable others skilled in the art to which it appertains to make and use the same.

My invention relates to improvements in automobiles, and more particularly to touring-cars, the object of the invention being to provide the body thereof with improved construction of shifting seat and coöperating parts which will permit the same to be made into a bed or couch whenever desired and as readily shifted to bring the seats into normal position for use during the day.

With this object in view the invention consists in certain novel features of construction and combinations and arrangements of parts, as will be more fully hereinafter described, and pointed out in the claims.

In the accompanying drawings, Figure 1 is a view in side elevation illustrating my improvements in normal position. Fig. 2 is a similar view showing the parts shifted to form a bed or couch. Fig. 3 is a top plan view of Fig. 2, and Figs. 4 and 5 are views of modifications.

1 represents the body of the automobile or touring-car provided with the rear seat 2 and front seat 3, the rear seat being fixed and stationary so far as this invention is concerned, and the sides and back 4 of the front seat are secured together, forming a single movable member, which can be shifted, as will be hereinafter explained, to form either a bed or seat, as may be desired. This member 4, comprising the back and sides of the front seat, is hinged at its forward edge to the front seat and can be swung forward to the position shown in Fig. 2. Beneath seat 3 is a slide 5, which may be drawn back to the rear seat 2 to bridge the space between the seats, and when vertical movable slides 6 at the ends of the front seat are drawn up to form the sides of the bed and cushions placed on the slide 5 a perfect bed or couch is formed, any well-known form of cover or tent being provided for the car.

As shown in Fig. 4, instead of hinging the member 4, comprising the back and sides of the front seat, at the forward edge it may be hinged at its rear edge and when swung down to a horizontal position will bridge the space between the seats, and, if desired, to make the bed or couch longer a slide 7 may be drawn forward from beneath the front seat, this slide being slotted or notched to receive the steering-shaft 8.

Another modification is shown in Fig. 5, especially designed for very large roomy cars, where there is room between the front and rear seats for a person to lie down. With such a car slides 10 and 11 are drawn from beneath the front and rear seats, respectively, to bridge the space between them. The bedclothes and other like movable articles may be stored during the day beneath the rear seats within convenient reach whenever desired.

A great many other slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a motor-vehicle, of a fixed rear seat, a front seat, a back and sides for the front seat hinged at the forward ends of said sides to the seat and adapted to be swung out of the way and means for spanning the space between seats and coöperate therewith to form a bed or couch.

2. The combination with a vehicle-body, of a fixed rear seat, a front seat, a back and sides for said front seat hinged to said seat and constructed to be swung longitudinally of the body, and vertical movable slides at the ends of the front seat forming when up, sides of the bed or couch.

3. The combination with a vehicle-body and a fixed rear seat, of a front seat, a back and sides for said front seat hinged at their forward edge to the front seat and adapted to be swung forwardly beyond the front seat, and means to bridge the space between the seats and coöperate with the latter to form a bed.

4. The combination with a vehicle-body and a fixed rear seat, of a front seat, means normally supported below said seats for bridging the space between the seats and a horizontally-movable slide normally supported beneath the front seat and constructed to be projected forward therefrom.

In testimony whereof I have signed this specification in the presence of two subscribing witnesses.

EDGAR P. BREWER.

Witnesses:
A. H. GREGG,
HARRY CULBERT